United States Patent [19]

Johnson et al.

[11] 4,097,666

[45] Jun. 27, 1978

[54] SOLVENT SYSTEM FOR POLYSACCHARIDES

[75] Inventors: Donald C. Johnson, Appleton, Wis.; Myron D. Nicholson, St. Albans, W. Va.

[73] Assignee: The Institute of Paper Chemistry, Appleton, Wis.

[21] Appl. No.: 681,561

[22] Filed: Apr. 29, 1976

[51] Int. Cl.² .................... C08B 11/02; C08B 16/00
[52] U.S. Cl. ...................... 536/57; 106/187; 106/203; 252/364; 536/84; 536/99; 106/197 R
[58] Field of Search ............... 536/57, 84, 99; 252/DIG. 4, 364; 106/187, 197, 203; 260/30.8 DS

[56] References Cited

U.S. PATENT DOCUMENTS

| | | | |
|---|---|---|---|
| 2,243,765 | 5/1941 | Morton | 536/84 |
| 2,397,437 | 3/1946 | Rust et al. | 536/84 |
| 2,679,449 | 5/1934 | Schappel | 536/99 |
| 2,787,595 | 4/1957 | Webb | 252/DIG. 4 |
| 2,879,268 | 3/1959 | Jullander | 106/187 |
| 2,901,389 | 8/1959 | Hossain | 167/82 DMSO |
| 2,924,502 | 2/1960 | Ucci et al. | 167/82 DMSO |
| 2,926,063 | 2/1960 | Reeves et al. | 167/82 DMSO |
| 2,987,434 | 6/1961 | Murray et al. | 167/82 DMSO |
| 3,070,553 | 12/1962 | Nagle et al. | 106/187 |
| 3,468,994 | 9/1969 | Gilbert | 252/364 |

OTHER PUBLICATIONS

Crown Zellerbach Product Information Bulletin, Dimethyl Sulfoxide (DMSO) Solvency Characteristics, 326-4, Aug. 1961, pp. 1-8.

Crown Zellerbach, Patents on uses of Dimethyl Sulfoxide (DMSO), 7/1963, pp. 1-31.

Bollettino Chimico Farmaceutico Abstract, vol. 102/1963, Dimethylsulfoxide, An Aquo-Mimetic Solvent, pp. 1-31.

"The New Cellulose Solvent: Dimethyl Sulfoxide--Paraformaldehyde", Johnson et al., 39th Executive Converence, The Institute of Paper Chemistry, Appleton, Wis. May 8, 1975.

"Dimethyl Sulfoxide-Paraformaldehyde: A Nondegrading Solvent for Cellulose", Johnson et al., Technical Paper Series No. 5, Apr. 1975, (first presented at the eighth Cellulose Conference at Syracuse, New York, May 19-23, 1975).

*Primary Examiner*—Ronald W. Griffin
*Attorney, Agent, or Firm*—Fitch, Even, Tabin & Luedeka

[57] ABSTRACT

Natural or modified polysaccharides are dissolved in a solvent system comprising dimethyl sulfoxide and formaldehyde. The solvent system is particularly suitable for dissolving cellulose due to the fact that cellulose is rapidly dissolved under moderate conditions of temperature and pressure. The dissolved polysaccharides are readily recovered from the solvent system by diluting the solvent system with water or a short chain alcohol.

23 Claims, No Drawings

SOLVENT SYSTEM FOR POLYSACCHARIDES

The present invention relates generally to the treatment of polysaccharides, and more particularly, the present invention is directed to a solvent system for polysaccharides, most particularly, cellulose, and to methods for utilizing the solvent system and the dissolved polysaccharides.

Many natural and modified polysaccharides, particularly cellulose, are insoluble in commonly used solvents. Some of these polysaccharides may be dissolved only by using extreme conditions which require high temperatures or highly acidic or basic solvents. Often, solution results only after several days of treatment. The use of such extreme conditions frequently results in degradation of the polysaccharide. Nevertheless, for many purposes, it is desirable to dissolve the polysaccharide. For example, chemical and physical modification of polysaccharides, such as occurs during fiber and film manufacture, require solutions of the polysaccharide. Solvents for polysaccharides are also of interest in connection with polymer properties of polysaccharides and modifications of the polysaccharide polymer chain.

Cellulose is a particularly useful polysaccharide and various features of the present invention will be particularly described in connection with the treatment of cellulose. A number of solvents for cellulose are known. Among the aqueous systems are included acidic media such as 72% sulfuric acid, basic media such as copper ammonium hydroxide and concentrated salt solutions such as 72% zinc chloride. Additional specific examples are listed and described elsewhere (G. Jayme in "Cellulose and Cellulose Derivatives," N M. Bikales and L. Segal, Ed., Interscience, New York, 1971, p. 381). With respect to the use of cellulose solutions in manufacturing processes, the aqueous solvent systems have numerous inherent disadvantages. These include any or all of the following: degradation or decrease in degree of polymerization of the dissolved cellulose, limitations on the type and amount of cellulose that will dissolve, and high cost since many contain substantial concentrations of mixtures of organic and inorganic chemicals. In addition, the aqueous solvents cannot be used for carrying out many desirable cellulose modification reactions because the chemicals required for such reactions are reactive toward water itself.

Nonaqueous solvents for cellulose also exist. Among them are included dinitrogen tetroxide in either N, N-dialkyl acyl amides or in dimethyl sulfoxide, sulfur dioxide and diethylamine in either acetonitrile or dimethyl sulfoxide and certain cyclic amine oxides. Again there are numerous disadvantages associated with commercial use of such solutions. The main problems are the expense of such solvents, cellulose degradation and the limited amount of cellulose that can be dissolved.

The main industrial process that involves use of a cellulose solution is the viscose process wherein during many steps cellulose is converted to cellulose xanthate which is dissolved in aqueous sodium hydroxide. Films and fibers can be formed via regeneration into acidic aqueous media. The process is costly because numerous steps are involved to prepare satisfactory solutions for fiber or film regeneration and these steps require expensive equipment. Also, carbon disulfide is required in the preparation of the cellulose xanthate, but is not part of the final regenerated cellulose. Its presence in the system can contribute to environmental problems.

It is an object of this invention to provide solutions of polysaccharides, and particularly, cellulose.

Another object of the invention is to provide a process for dissolving a substantial variety of natural and modified polysaccharides without isolation of a chemical derivative or degradation of the polysaccharides.

Another object is to provide a means whereby the chemical and physical properties of various polysaccharides, such as cellulose, may be modified by chemical reactions which are facilitated by solution.

A further object is to provide a solvent system for polysaccharides, particularly cellulose.

A still further object of the present invention is to facilitate cellulose manufacturing processes, such as papermaking, fiber forming, and film forming, by providing a solvent system for cellulose.

Further objects and advantages of the invention will become more apparent from the following detailed specification and claims.

Generally, according to the present invention, it has been found that many natural or modified polysaccharides may be dissolved in a solvent system comprising dimethyl sulfoxide and formaldehyde. The term "formaldehyde" is used broadly to include all formaldehyde-related species in the solution such as molecular formaldehyde, formaldehyde hydrate, formaldehyde bonded to the polysaccharide, dioxymethylene, trioxymethylene and higher polymeric forms of the series HO$(-CH_2O)_n-$H where $n$ represents the number of formaldehyde units in a linear molecule.

The solvent system of the present invention is particularly suitable for dissolving cellulose due to the fact that cellulose is rapidly dissolved under moderate conditions of temperature and pressure, and the cellulose does not undergo degradation in the solvent system. The polysaccharides may be readily and simply recovered from the solvent system by diluting the solvent system with a regenerating medium selected from water, a short chain alcohol or mixtures of water and short chain alcohols. By the term "short chain alcohols" is meant those straight or branched chain aliphatic alcohols having from 1 to 6 carbon atoms. Particularly preferred alcohols for reasons of economy and availability are methanol and ethanol.

The polysaccharides can be present in the solvent system at a level of up to about 20% by weight of dimethyl sulfoxide in the solution. More specifically, cellulose having a DP of from about 300 to about 500 can be present in the solvent system in an amount of up to about 8% by weight of the solution without difficulty. At concentrations higher than about 8% of cellulose of this DP the solutions can become viscous and difficult to handle. All percentages used herein are by weight, unless otherwise indicated.

At the initiation of the dissolving process, the formaldehyde is present in the solvent system relative to the polysaccharide at a ratio of from about 0.1:1 to about 20:1 by weight, preferably from about 2:1 to about 10:1. The optimum ratio depends on the degree of polymerization of the polysaccharide and whether the solution is prepared in an open or closed system. In an open system, some formaldehyde gas is lost during the solution of the polysaccharides. In this connection, for open systems some excess of formaldehyde may be required to provide the desired level of formaldehyde in the solvent system. Less formaldehyde is needed if the dissolution is done in a closed pressure vessel. After formaldehyde gas has evolved and cellulose has dissolved in the open system, the solution generally contains less than about 1% of formaldehyde. If the solution is freeze-dried, the resulting white solid can be redissolved in dimethyl sulfoxide and the only formaldehyde present is that which is bonded to the polysaccharide. The amount of water present in the solvent system should be ordinarily limited to less than about one percent to insure complete solution of the polysaccharide.

While not wishing to be bound by any theory, it is believed that a polysacchride derivative is formed during solution of a polysaccharide in the solvent system of the invention and, more particularly, it is believed that a hemiacetal derivative of the polysaccharide is formed. In the case of cellulose, it is believed that the hemiacetal, methylol cellulose, is formed. It is believed that the mechanism by which cellulose dissolved in the solvent system is dependent, at least in part, on the formation of methylol cellulose. As formaldehyde is introduced into the solvent system, a portion of the formaldehyde reacts with the cellulose hydroxyl groups, with the primary $C_6$ hydroxyl group being the favored reaction site. Dimethylsulfoxide promotes swelling of the cellulose so that reaction with the formaldehyde is reasonably uniform. The dimethyl sulfoxide also stabilizes the hemiacetal units ($-OCH_2OH$) through hydrogen bonding after they have been formed. Thus, the resulting solutions are stable for many months, as long as they are protected from an increase in water content. The strong association between the methylol cellulose and dimethyl sulfoxide prevents the cellulose chains from aggregating together and precipitating from solution. This helps to prevent cross-linking of the dissolved cellulose.

When the methylol cellulose solution is freeze-dried, a white solid is obtained. This solid is easily soluble in dimethyl sulfoxide at room temperature, whereas cellulose is not soluble in dimethyl sulfoxide.

The solvent system of the invention is capable of dissolving a wide variety of cellulosic materials, some of which resist complete dissolution in other cellulose solvents. Celluloses successfully dissolved have had degrees of polymerization ranging from 16 to over 8,000. A holocellulose containing 18% xylan, in addition to cellulose, was successfully dissolved.

In addition to cellulose, numerous other polysaccharides are dissolved in the solvent system of the invention. For example, when a kraft softwood pulp containing 12.6% lignin is treated with the solvent, the fraction which dissolves contains both cellulose and hemicelluloses. The latter polysaccharides include in their composition arabinose, galactose, xylose, mannose and glucose. Although isolated hemicelluloses can dissolve in dimethyl sulfoxide to a significant extent, enhanced solubility has been demonstrated for a xylan polymer in the solvent system of the invention.

The polysaccharide solutions of the present invention can be used in various industrial processes. Short fibers can be prepared from a cellulose solution and these fibers can be used in the manufacture of paper. Longer fibers of cellulose can be prepared and used to manufacture a textile material. Also, sheets of clear transparent cellulose can be provided from the cellulose solutions of the invention. The manufacture of these fibers and sheets from the solution is believed to be within the skill of the art. Likewise, the utilization of the fibers and sheets is predictable in many applications.

The ease with which chemical reactions can take place in solution is a specific advantage of the solvent system of the invention. Both novel and common derivatives of cellulose can be prepared by proper choice of reaction conditions. For example, ether derivatives can be prepared such as carboxymethyl cellulose and methyl cellulose. The reaction can be controlled by use of sodium hydride to give a high distribution of carboxymethyl (or methyl) ether groups at the C-2 and C-3 oxygens relative to the C-6 oxygen. The methylol groups can, under proper conditions, be retained in an acetal structure to give, for example, a novel carboxymethyl methylol cellulose. In this latter case, the carboxymethyl groups are bonded to the cellulose through an acetal linkage rather than an ether linkage.

Cellulose can be modified by dissolving other polymers in the solvent of the invention along with the cellulose. When two or more polymers are dissolved together in a common solvent, a new resin composition may be formed by one of several phenomena, for example (a) the different polymer constituents may react chemically to form a larger molecule which is an interpolymer of the individual polymers, or (b) coprecipitation of two or more polymers together from a common solvent can occur.

The following examples further illustrate various features of the present invention but are intended to in no way limit the scope of the invention which is defined in the appended claims.

EXAMPLE 1

A mixture of acetate-grade cotton linters (0.10 grams) and dimethyl sulfoxide (10.0 milliliters) was heated with rapid stirring to 94° C to 100° C. A stream of formaldehyde gas was bubbled into the mixture at this temperature. The formaldehyde was generated by thermal decomposition of 1.8 grams of paraformaldehyde. A clear, viscous cellulose solution was obtained.

EXAMPLE 2

Acetate-grade cotton linters (0.10 grams) and paraformaldehyde powder (0.50 grams) were dispersed in dimethyl sulfoxide (10.0 milliliters) at room temperature. The mixture was then heated with rapid stirring to 130° C. over a period of 6 to 8 minutes. Evolution of formaldehyde occurred and shortly after the onset of vigorous bubbling, a clear solution was obtained.

A portion of the dissolved cellulose was regenerated from the solution by adding the solution to water. Another portion of the dissolved cellulose was regenerated from solution by adding the solution to methanol. The regenerated cellulose was washed several times with water and freeze-dried. Investigation by X-ray diffraction, infrared and Raman spectroscopy showed that the regenerated cellulose was cellulose II of low crystallinity.

The dissolved cellulose was also regenerated by injecting a thread of the cellulose solution through a nozzle into a tray of methanol to provide a rayon-like fiber. A film of regenerated cellulose was also prepared by extruding a flat sheet of the cellulose solution into a tray of methanol.

EXAMPLE 3

A hardwood kraft dissolving pulp (6 grams) was fluffed in a Waring Blendor and was then added along with paraformaldehyde powder (10.1 grams) to dimethyl sulfoxide (100 milliliters). The mixture was then heated to 130° C. with vigorous stirring. Gas evolution was noted and the cellulose completely dissolved. On cooling the solution was clear and viscous.

EXAMPLE 4

The procedure of either Example 2 or Example 3 was followed except that paraformaldehyde powder was added to a stirred suspension of cellulose and dimethyl sulfoxide which had been heated to about 125° C. After the paraformaldehyde addition the mixture was heated to about 130° C. During the heating period gas was evolved and the cellulose dissolved.

EXAMPLE 5

Cellulose and associated hemicelluloses were dissolved from a Kraft (sulfate) pulp prepared from southern pine. The pump contained 12.6% Klason lignin. The pulp (0.200 grams) and paraformaldehyde powder (2.0 grams) were dispersed in dimethyl sulfoxide (20.0 milliliters). The mixture was heated with rapid stirring to 130° C. over 17 minutes. Formaldehyde gas was evolved during heating. The mixture was cooled to approximately 70° C. and a second charge of paraformaldehyde (1.0 gram) was added. The mixture was again heated to 130° C. with renewed evolution of formaldehyde.

The solution was separated from the undissolved residue by centrifugation. The residue was then washed with dimethyl sulfoxide (20 milliliters) and the wash was combined with the supernatant fraction. The residue was washed twice with water and was then freeze-dried. A residue of 0.074 grams was obtained.

The solution was poured slowly into methanol to regenerate dissolved polysaccharides. The resulting solid was collected on a sintered glass filter funnel and washed with water. The dried, regenerated polysaccharides amounted to 0.116 grams or 58% of the original pulp. In addition to cellulose, analysis showed small amounts of polysaccharides (hemicelluloses) containing arabinose, xylose, mannose, glucose, and galactose units.

EXAMPLE 6

It is possible to prepare methylol cellulose as a solid material which can be easily dissolved in dimethyl sulfoxide. Thus, a cellulose solution similar to those described in Examples 1–5 is prepared; with the exception that the solution prepared from solid methylol cellulose contains very little, if any, formaldehyde or formaldehyde-related species of the type HO $(-CH_2-O)_n$-H.

A 5% solution of cellulose, as prepared in Example 4, was frozen and freeze-dried for 72 hours. The resulting white solid contained about 20% of dimethyl sulfoxide which could not be removed by prolonged freeze-drying. The remainder of the white solid was shown to be methylol cellulose by analysis of its Raman spectrum, instability in water, formaldehyde analysis after treatment with water and its rapid dissolution in dimethyl sulfoxide at room temperature. The methylol cellulose so prepared contains approximately one methylol group ($-CH_2OH$) for every anhydroglucose unit.

A solution amounting to 5% of cellulose was easily prepared by dissolving the solid methylol cellulose in dimethyl sulfoxide at room temperature. The nuclear magnetic resonance spectrum of this solution, in contrast to a solution prepared as in Example 4, showed no detectable amounts of molecular formaldehyde or formaldehyde-related species of the type HO $(-CH_2O)_n$-H.

EXAMPLE 7

An elm xylan (0.20 grams) was suspended in dimethyl sulfoxide (10 milliliters) and the mixture was heated with stirring to 124° C. Paraformaldehyde (0.58 grams) was added, vigorous gas evolution occurred and the xylan completely dissolved. The resulting clear, pale yellow solution remained clear on cooling to room temperature. Attempts to prepare a 2% solution of the xylan in dimethyl sulfoxide without addition of paraformaldehyde were not successful.

EXAMPLE 8

A 3% solution of cellulose (Whatman CF-1, D.P. about 600) was prepared as described in Example 4. Sodium hydride (6 grams) was added slowly to the cellulose solution (100 milliliters). The reaction mixture was mechanically stirred at 19° C. and within 1 hour became gel-like. After 2 hours, methyl bromoacetate (7 milliliters) was added dropwise over a 1–2 hour period. The gel gradually dissolved, but eventually the reaction product precipitated from the medium. Total reaction time was 16–20 hours at 19° C. The reaction mixture was poured slowly into a well stirred solution (50 ml.) of formic acid and water (1:1 on a volume basis). The resulting solution was dialyzed against distilled water using a membrane capable of retaining material having molecular weights above 50,000. The resulting aqueous solution of carboxymethyl cellulose was freeze-dried. Presence of carboxymethyl ether groups was confirmed by acid-catalyzed hydrolysis to produce known carboxymethyl glucose derivatives.

EXAMPLE 9

A 3% solution of cellulose was prepared as described in Example 4. Methyl chloroacetate (1 ml.) was added to the above solution (20 ml.). The reaction system was stirred continuously as triethylamine (0.2 ml.) was added dropwise. The reaction was allowed to proceed for 22 hours at 23° C. It was then frozen and freeze-dried to remove both solvent and excess methyl chloroacetate. The resulting white solid showed an infrared absorption band (at 1745 cm.$^{-1}$) characteristic of the methyl ester group associated with the methyl ester of carboxymethyl cellulose. Acid-catalyzed hydrolysis of this material gave only glucose and no significant amounts of the carboxymethyl ethers of glucose. It is concluded that an acetal link has been formed in the reaction of the methylol cellulose with methyl chloroacetate. The novel product is this reaction is the methyl ester of carboxymethyl methylol cellulose i.e., carboxymethylation of the methylol moieties has occurred rather than etherification of the C-2, C-3 or C-6 hydroxyls of cellulose.

The product of this example can itself be subjected to carboxymethylation using the conditions of Example 8. The result is a novel, selective etherification of the C-2 and C-3 hydroxyls of cellulose.

EXAMPLE 10

A 3% solution of cellulose was prepared as described in Example 4. Sodium hydride (2 grams) was added with stirring to this solution (50 ml.) at 19° C. After 2 hours, methyl iodide (3 ml.) was slowly added. The gel dissolved and the reaction was continued for 24 hours. Purification was carried out in the same manner as described in Example 8 using dilution with formic acid and water followed by dialysis. The freeze-dried product was methyl cellulose. Higher degrees of substitution could be obtained by repeated treatments with sodium hydride and methyl iodide.

EXAMPLE 11

A copolymer blend of polyacrylonitrile and cellulose was prepared. A 1% solution (50 ml.) of cellulose was prepared as described in Example 4. A solution of polyacrylonitrile (0.50 grams) in dimethyl sulfoxide (50 ml.) was also prepared. The two solutions were then thoroughly mixed with mechanical stirring. A portion of the resulting solution was cast on glass slides and films were formed. The remaining solution was poured into water to regenerate the blended copolymer of cellulose-polyacrylonitrile. After thorough washing and freeze drying, the fluffy, white solid was analyzed by infrared spectroscopy. The spectrum confirmed the presence of both cellulose and polyacrylonitrile in the copolymer blend.

What is claimed is:

1. A composition comprising a natural or modified polysaccharide dissolved in a solvent system comprising dimethyl sulfoxide and formaldehyde.

2. A composition in accordance with claim 1 wherein said polysaccharide is cellulose.

3. A composition in accordance with claim 1 wherein said formaldehyde is present in said solvent system at a ratio of from about 0.1:1 to about 20:1 by weight of said polysaccharide.

4. A composition in accordance with claim 1 wherein said formaldehyde is derived from paraformaldehyde.

5. A composition in accordance with claim 1 wherein water present in said solvent system is limited to less than about 1%.

6. A method for dissolving polysaccharides comprising adding said polysaccharide to a solvent system comprising dimethyl sulfoxide and formaldehyde.

7. A method in accordance with claim 6 wherein said polysaccharide is cellulose.

8. A method in accordance with claim 6 wherein said formaldehyde is present in said solvent system at a ratio of from about 0.1:1 to about 20:1 by weight of said polysaccharide.

9. A method in accordance with claim 6 wherein said formaldehyde is derived from paraformaldehyde by heating said solvent system containing dimethyl sulfoxide and paraformaldehyde.

10. A method in accordance with claim 6 wherein water present in said solvent system is limited to less than about 1% by weight.

11. A method for manufacture of methylol cellulose comprising adding cellulose to a solvent system comprising dimethyl sulfoxide and formaldehyde.

12. A method in accordance with claim 11 wherein said formaldehyde is present in said solvent system at a ratio of from about 0.1:1 to about 20:1 by weight of said polysaccharide.

13. A method in accordance with claim 11 wherein said formaldehyde is derived from paraformaldehyde by heating said solvent system comprising dimethyl sulfoxide and paraformaldehyde.

14. A method in accordance with claim 11 wherein said water present in said solvent system is limited to less than about 1% by weight.

15. A method for manufacture of a cellulose fiber comprising dissolving cellulose in a solvent system comprising dimethyl sulfoxide and formaldehyde, and regenerating a fiber from said celluose solution by injecting a stream of said solution into a regeneration medium selected from the group consisting of an aqueous medium and short chain alcohols.

16. A method in accordance with claim 15 wherein said short chain alcohols are C-1 – C-6 straight or branched chain aliphatic alcohols.

17. A method in accordance with claim 15 wherein said short chain alcohols are selected from methanol and ethanol.

18. A method for the manufacture of a cellulose film comprising dissolving cellulose in a solvent system comprising dimethyl sulfoxide and formaldehyde and regenerating a film from said cellulose solution by injecting a film of said solution into a regeneration medium selected from the group consisting of an aqueous medium and short chain alcohols.

19. A method for the manufacture of a cellulose film in accordance with claim 18 wherein said short chain alcohols are C-1 – C-6 straight or branched chain aliphatic alcohols.

20. A method for the manufacture of a cellulose film in accordance with claim 18 wherein said short chain alcohols are selected from methanol and ethanol.

21. A method for making paper comprising treating a cellulose source with a solvent system comprising dimethyl sulfoxide and formaldehyde so as to dissolve cellulose from said source, regenerating said cellulose from said solution by diluting said solution with a regeneration medium selected from the group consisting of an aqueous medium and short chain alcohols, and forming a web from said regenerated cellulose.

22. A method for making paper in accordance with claim 21 wherein said short chain alcohols are C-1 – C-6 straight or branched chain aliphatic alcohols.

23. A method for making paper in accordance with claim 21 wherein said short chain alcohols are selected from methanol and ethanol.

* * * * *